(12) United States Patent
Holland et al.

(10) Patent No.: US 6,556,672 B1
(45) Date of Patent: Apr. 29, 2003

(54) FAULT TOLERANT VOICE PROCESSING SYSTEM

(75) Inventors: John Holland, Titirangi (NZ); Paul Ranford, Auckland (NZ); Peter Robson, Auckland (NZ)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/455,677

(22) Filed: Dec. 7, 1999

(51) Int. Cl.[7] .............................................. H04M 5/00
(52) U.S. Cl. ...................................... 379/279; 709/203
(58) Field of Search .......................... 379/279; 709/203, 709/315–318; 714/38

(56) References Cited

U.S. PATENT DOCUMENTS 5,454,025 A * 9/1995 Mulrow et al. ........ 379/221.03
6,205,557 B1 * 3/2001 Chong et al. ................ 379/272
6,320,949 B1 * 11/2001 Kim ...................... 379/201.01

* cited by examiner

Primary Examiner—Ahmad F. Matar
Assistant Examiner—Quynh Nguyen
(74) Attorney, Agent, or Firm—Kaplan & Gilman, LLP

(57) ABSTRACT

A fault tolerance call processing system is disclosed. The fault tolerance at the server level is achieved by shadowing between primary functional components and standby functional components running on a plurality of processors accommodated on several CT servers. The fault tolerance at resource level is achieved by allowing reallocation of resources from any circuit boards and platforms to process a call.

24 Claims, 2 Drawing Sheets

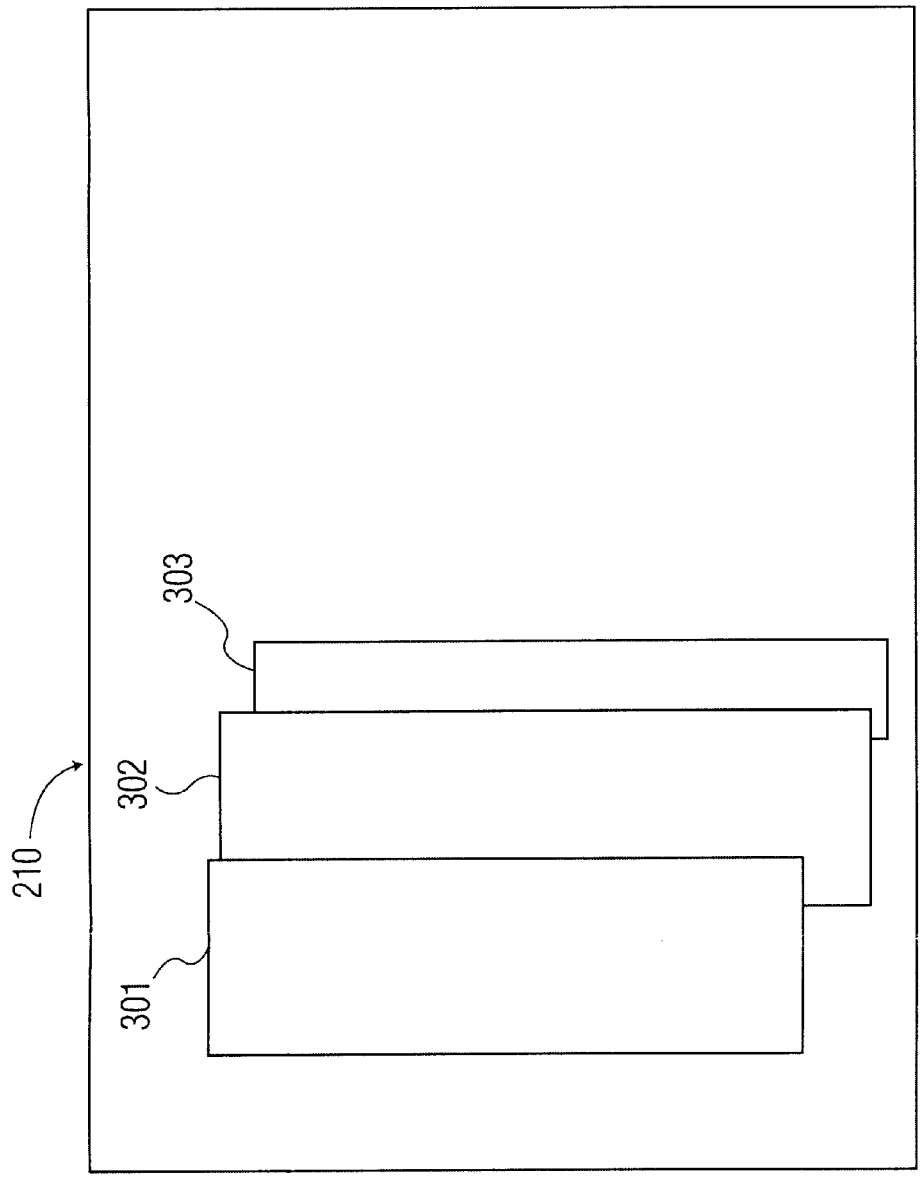

FAULT TOLERANT VOICE PROCESSING SYSTEM

TECHNICAL FIELD

This invention relates to a voice processing system, and more particularly, to an improved call processing architecture that permits fault tolerance at server and/or resource levels.

BACKGROUND OF THE INVENTION

Voice processing systems have become prevalent in modern day society. Such systems typically involve a telephone caller dialing into a computerized integrated voice response (IVR) system. The interaction between the remote user dialing in and the computerized system varies widely and is application specific. Typical examples of such systems include banking systems which allow a user to transfer funds between accounts and ascertain account balances, credit card corporation systems, etc.

Recently, it has also become popular to merge together these voice processing systems with facsimile, e-mail, voice mail and other capabilities. One such example is what is termed fax-on-demand. In fax-on-demand systems, a remote user dials in to a computer and enters through his telephone keypad the digits corresponding to a particular item or product number. Additionally, a facsimile number may be entered via a touch tone keypad, and is interpreted by this system. The fax-on-demand system then transmits documentation regarding the particular item or product to a facsimile machine located at the specified remote telephone number.

In view of the evolving and complex nature of many of today's modern voice processing systems, it has become standard to construct such voice processing systems from a plurality of different client applications. The voice processing applications may include fax-on-demand, voice mail, etc., all interconnected via a local area network or other such means.

It has also become fairly standard to utilize voice processing resources flexibly between calls. For example, typical voice processing resources include such items as tone detectors for detecting the digits entered via a DTMF keypad, echo cancellors for filtering echo from the telephone network, voice recognition software for allowing a remote user to input commands via voice, etc.

One problem comes from the need of high reliability at the server level. Fault tolerance at the computer telephony server, which communicates between the voice processing applications and the voice processing resources, is becoming more and more necessary as many services are integrated together to deal with different kinds of call requests, some of which require a high level of reliability.

The other problem comes from the fact that multiple vendors each implement their systems differently, the voice processing applications, as well as the resources, tend to vary widely in their design and implementation. Such systems are not very flexible because there usually exists a set of circuit boards on a single platform for implementing all of the required call processing functions. Once one of the required resources on the platform operates, improperly, or one or some of the resources on the platform are used up, the calls simply cannot be processed and are instead stopped or blocked. This problem is becoming more serious with the fact that more and more services tend to be integrated together to meet the different requests from a caller in a single call.

In view of the foregoing, there exists a need in the art for a more reliable voice processing system which has fault tolerance at the server level and the resource level. The system should also be flexible and configurable so as to optimally utilize the resources of a variety of different vendors in a variety of different configurations.

SUMMARY OF THE INVENTION

The above and other problems of the prior art are overcome and a technical advance is achieved in accordance with the present invention which relates to a two-tier fault tolerant voice processing system. In accordance with the invention, a plurality of call processing resources are arranged on various circuit boards (i.e., voice processing cards). Such boards are installed into a plurality of particular voice processing platforms. A plurality of voice processing applications, possibly running on different computers, communicates with a plurality of processors which co-operate on at least one CT server.

Each processor includes one or more primary functional components carrying out respective specific functions required for call processing. Each of the primary functional components is covered by a standby component which will operate if said each functional component stops operating. Thus, the functional components at the server level (Tier 1) achieve fault tolerance through redundancy.

The resources may be from different vendors, from the same or different voice processing boards, and from the same or different voice processing platforms. When a resource required by a particular call stops operating, the server may reallocate a substitute one from all the remaining operable resources on all the platforms so that a fault tolerance at the resources is achieved and the call may continue without interruption. Thus, at the resource level, N+1 redundancy is achieved.

In a preferred embodiment, there are at least two servers, and each of the functional components and its standby component are located in different servers. In such a case, when a server stops operating, the corresponding standby components on other server or servers begin to work and take over all the functions previously carried out by the components on the stopped server. The functionality of the faulty server is preferably divided among the remaining servers.

In a further embodiment, each of the servers has some primary functional components and some standby functional components, but any of the primary components and its standby one are not located at the same server. The loads of the system are shared by all servers, each carrying out different functions.

Fault tolerance is achieved at the server level by shadowing between the primary functional components and their standby counterparts, and at the resource level as N+1 redundancy (i.e., allowing the system to simply diminish the total resource pool but not become inoperable as resources fail). Additionally, the system capacity may be increased by simply adding resources at the resource level and by increasing the number of processors on the CT servers.

In a preferred embodiment, calls may be processed by allocating resources in a preferred priority scheme. This scheme is optimal and may take into account the factors such as the location of the resources, the traffic patterns, the scarcity of certain resources, etc.

DESCRIPTION OF THE DRAWINGS

FIG. 2 shows a diagram of a voice processing platform that may be used in implementing the system described herein.

DETAILED DESCRIPTION OF THE PREFERRED EMBODIMENT

Figure 1:
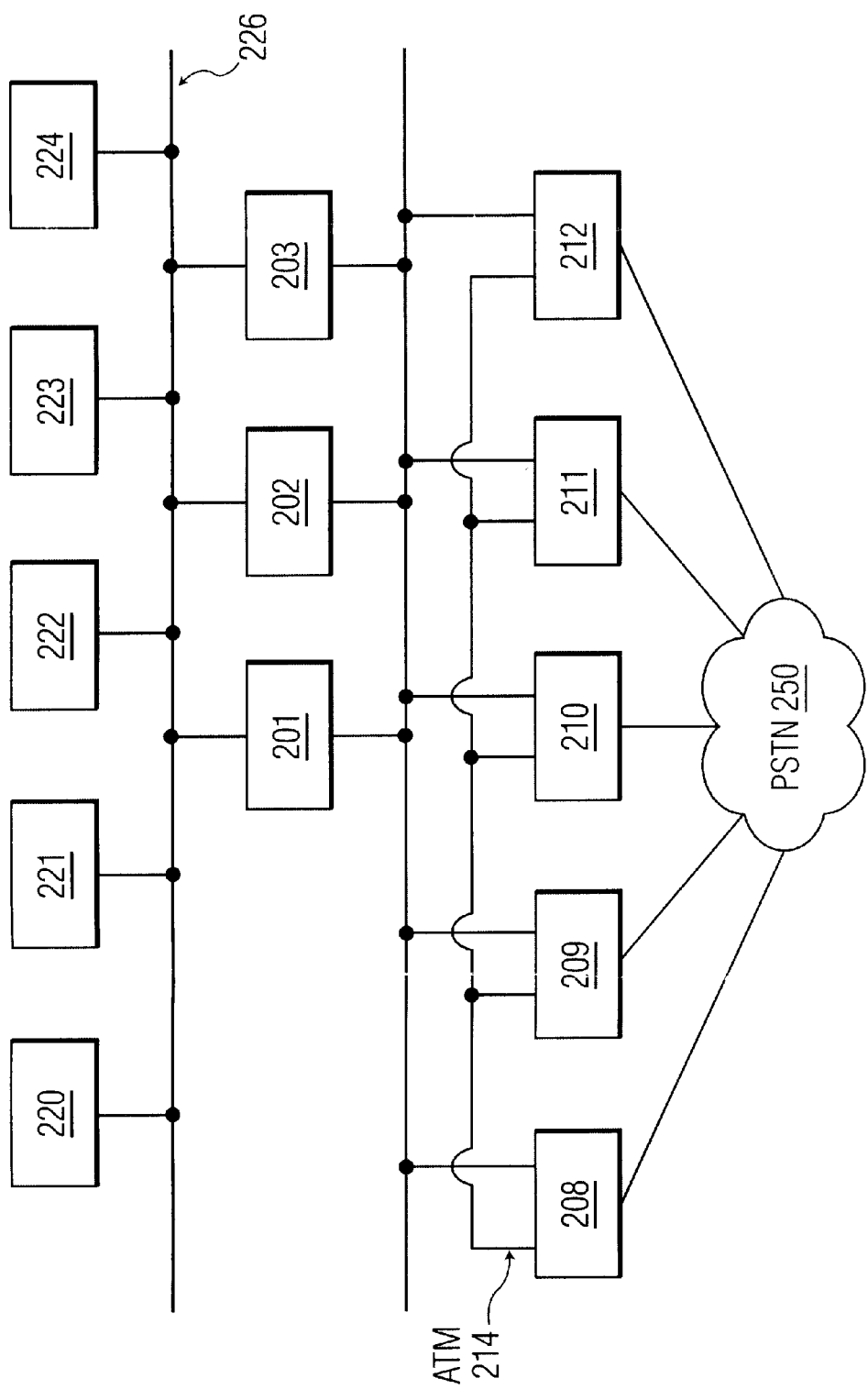
FIG. 1 shows a conceptual block diagram of an exemplary embodiment of the present invention.

FIG. 1 shows an exemplary functional diagram for implementing teachings of the present invention. The arrangement in FIG. 1 includes a plurality of client personal computer based systems 220–224 all connected via a network 226 and in communication with a plurality of CT servers, three of which 201, 202 and 203 being shown here, preferably via a local area network. The PC based systems run a variety of voice processing and call center applications which vary greatly from system to system. The particular techniques utilized by each of these systems is not critical to the present invention.

Voice processing platforms 208–212 communicate with the CT servers 201 to 203 via a network and a standard S.300 or other type of protocol. The platforms 208–212 may also be interconnected with each other via an ATM switch 214 or other switch arrangement so as to improve versatility of configurations.

Each of the CT servers 201 to 203 has a plurality of processors. A plurality of primary functional components are provided on these processors for carrying out specific functions required by calls. These functions may include Logical Connection Manager (LCM), Resource Allocation Service (RAS), System Call Router (SCR), Intelligent Switch Extensions (ISE), Handoff manager, etc. Each of the primary functional components, or at least those carrying out important functions, have a counterpart standby functional component that is able to carry out the same function. These standby functional components are also provided on these or other processors accommodated by the servers 201–203 and are kept shadowed. When a primary functional component stops operating or operates improperly, its shadowed counterpart standby functional component begins to work and take over the function previously carried out by the primary component. A fault tolerance is thereby achieved.

Each of the processors on each CT servers 210–203 may include only one of said functional components, either primary or standby. In this case, the number of the processors are the sum of all the primary and standby components and a very high throughput is reached.

One of the processors may include more than one functional component. Preferably, a primary component and its standby component are not included in the same processor or on the same server in case this processor or server operates improperly and there is no other substitute component that can be used.

In an embodiment, one processor may include both primary components and standby components (not standby for the former). Such an arrangement may increase the capacity of the processors and decrease the numbers of the required processors.

In another embodiment, one processor may only include primary components or only include standby components. In such an arrangement, the processors including only standby components may rest standby and only works when the primary components stops working.

In one configuration, the system may only include one CT server and all the primary and standby functional components are accommodated on this sole server. The fault tolerance is achieved within the server. This requires a very high level of reliability of this server.

Usually there shall be two or more CT servers to increase the reliability of the system. Three servers 201–203 are shown in FIG. 1, but the number of the servers is not critical. Each of the servers may include both primary functional components and standby components, and again, a primary component and its standby component are preferably not be accommodated in the same server. In such an arrangement, different servers carry out different functions and the load of the system is shared among the servers.

As an alternative, each of the servers may include either only primary or only standby components. In such an arrangement, a fault tolerance is actually achieved by shadowing between or among the servers, that is, when one server (or one of some primary functional components thereon) stops operating, other server or servers, which only bear the standby components and are previously kept shadowed, begin to work.

The technique used for shadowing between a pair of the primary component and its standby component may be different from that used for shadowing between another pair.

In operation, a call arrives from the remote user over public switch telephone network (PSTN) 250 and is received through one of call processing platforms 208–212. The processors on the CT servers receive the call and connect the appropriate application 220–224 to the call. The CT servers, with allocation software running thereon, then analyze the call in response to messages received from the application in order to ascertain the particular group of resources which is required to process the particular call. Depending upon the call and/or the application, these resources may include items such as tone generators, speech recognition algorithms, echo cancellors, or any other of a variety of potential resources for processing various aspects of any particular call. The assembling, modification, and disassembling of the group of resources is described in U.S. Pat. No. 5,608,791.

Based upon the particular arriving call and the application, the CT servers 201–203 determine which particular resource types are necessary in order to process the call. The CT servers then include a record of the particular resources available on each of platforms 208–212. The particular resource types are picked and configured into a logical group, so that the call may be processed by those resources. Each of those resources communicates with the CT servers 201–203 via the S.300 standard protocol, and thus, the resources may be from different vendors, yet still be utilized to process a single call. Moreover, the application is unaware of the particular resource utilized and whether those resources are located on the same board or platform, or from different vendors.

FIG. 2 shows a conceptual diagram of one of voice processing platforms 210. The voice processing platform 210 is populated with voice processing (resource) boards 301–303. These boards may be identical or different and may be utilized for different calls in different manners, as required by the system. Call processing resources on any particular board may be utilized by any particular line calling in. The resource, the board, or even the platform is tied to no particular channel, and thus, the entire system is utilized as a large resource pool spanning multiple platforms and ensuring availability of all resources to all calls.

When a resource required by the call becomes inoperable, the relevant processor in the CT servers will pick another one, from all the operable resources in all the platforms, to replace it so that the call will go on without interruption. In this way, a level of fault tolerance at the resource level is achieved. If a single circuit board or even a platform becomes inoperable, the resources from that board or platform would be available on other platforms or boards. Other than slightly diminished system capacity as a result of the fact that less of the resource type is available, the applications and the other call processing resources are unaffected by the fact that a single board or resource has dropped out of the system as a result of becoming inoperable.

When a new resource is required as new services are requested during a call, the system may allocate this new resource, again according to a priority scheme, among all the available resources on all the platforms. Moreover, flexibility and scalability in the system is also automatically achieved because capacity may be increased by adding more resources.

In the preferred embodiment, a priority scheme is utilized to allocate the required resources. For example, the priority scheme may attempt to locate as many of the resources as possible, if not all of them, on the same board. Since the CT servers have a list of all of the different resources and where they are located, this can be attempted first. If the resources are not available on the same board, the CT servers attempt to locate them on the same platform, and ultimately, on different platforms only if necessary. Aside the location factors, many other factors may also be taken into account to determine a priority scheme so as to provide the best fit. These factors may include the traffic patterns, the scarcity of certain resources, the retaining of the released resources, etc.

In an additional embodiment, human user interaction is permitted to assist the system in determining how to allocate the call processing resources for a particular call or a portion thereof. Specifically, based upon system loading, priorities, or other criteria, a human operator may determine that certain resources should be used for particular call processing. In such a scenario, the CT servers 201–203 provide an interface to permit the operator to override the allocation that would otherwise be set by the system.

The above describes the preferred embodiment of the invention. Various other modifications and additions are apparent to those of skill in the art, and such modifications are intended to be covered by the following claims.

What is claimed is:

1. A fault tolerance call processing system for connection to the public switched telephone network comprising:

a plurality of client computers containing call processing applications;

a plurality of voice processing resources required for processing calls; and at least two computer telephony servers for interfacing between said client computers and said voice processing resources, each of said servers containing one or more processors communicating with said call processing applications and said resources, each of said processors having one or more primary and/or standby functional components each of which carrying out a particular call processing function, each of said standby functional components beginning to work only when its counterpart primary functional component stops operating whereby a fault tolerance at the server level is achieved by shadowing between said primary functional components and their counterpart standby functional components;

wherein each of said two servers contains at least one of said primary functional components and at least one of said standby functional components, and at least one of said primary functional components and its standby functional components are located in different servers.

2. The system of claim 1 wherein each processor only contains one of the functional components.

3. The system of claim 1 at least one of said processors contains at least one of said primary functional components and at least one of said standby functional components.

4. The system of claim 1 wherein each of said primary components and its standby counterpart are located in different processors.

5. The system of claim 1 wherein each of said primary functional components has a standby functional component.

6. A two-tier fault tolerance call processing system for connection to the public switched telephone network comprising:

a plurality of platforms, each of said platforms containing one or more circuit boards, and each of said circuit boards containing at least one call processing resources;

one or more computer telephony servers for interfacing to a plurality, of client computers containing call processing applications, each of said servers containing one or more processors communicating with said call processing applications and each of said platforms, each of said processors having one or more primary and/or standby functional components each of which carrying out a particular call processing function;

allocation software running on said servers for allocating, in responses to messages from said call processing applications, a group of resources from said platforms for a particular telephone call being processed, said allocation software being arranged to allocate the resources either from the same or different platforms, depending upon availability;

wherein at least one of said primary functional components has a standby functional component on said servers, said standby functional component beginning to work only when its counterpart primary functional component stops operating whereby a fault tolerance at the server level is achieved by shadowing between said primary functional components and their counterpart standby functional components; and wherein a fault tolerance among the resources is achieved by re-allocating said group of the resources among operable resources on all said platforms when a resource stops operating.

7. The system of claim 6 wherein there are at least two servers and each of said primary functional components and its standby counterpart are accommodated by different servers.

8. The system of claim 7 wherein at least one of said servers contains at least one of said primary functional components and at least one of said standby functional components.

9. The system of claim 8 wherein each of said servers accommodates either only said primary functional components or only said standby functional components.

10. The system of claim 6 wherein said allocation software has a priority scheme to allocate resources to the extent that such allocation permits optimal call processing.

11. The system of claim 6 wherein said servers and said platforms communicate using an S.300 protocol.

12. The system of claim 6 wherein said sources are from different vendors.

13. The system of claim 6 wherein said allocation software is configured to route information for processing a call to and from resources allocated for that call such that the call processing application processing that call processes the call in a substantially identical manner whether the allocated resources are from the same or different boards or platforms, or from different vendors.

14. The system of claim 6 wherein at least one of the server includes a user interface and software which allow a user to specify resources to be used in processing a call, thereby overriding the resources allocated by the server.

15. A method of achieving fault tolerance in a call processing system, said call processing system comprising a plurality of call processing resources and at least two computer telephone servers, each of said servers containing one or more processors communicating with call processing applications and each of said resources, at least one of said processors having one or more primary functional components each of which carrying out a particular call processing function, the method comprising the steps of:

providing on said processors of said servers standby functional components for said primary functional components such that each of said two servers contains at least one of said primary functional components and at least one of said standby functional components, and at least one of said primary functional components and its standby functional components are located in different servers; and keeping each of said standby functional components shadowed when its counterpart primary component operates properly and using said shadowed standby functional component when said primary component stops operating.

16. The method of claim 15 wherein said primary functional components and their standby functional components are arranged such that each of said primary components and its counterpart standby component are not on the same server.

17. The method of claim 15 wherein each of said primary components has a standby component.

18. The method of claim 15 wherein each of said processors contains only one of said functional components.

19. The method of claim 15 wherein at least one of said processors contains at least one of said primary components and one of said standby components.

20. The method of claim 19 wherein each of said primary components and its standby component are located on different processors.

21. A method of achieving two-tier fault tolerance in a call processing system, said call processing system comprising a plurality of platforms containing call processing resources and one or more computer telephone servers for communicating with call processing applications and said platforms, each of said servers containing one or more processors communicating with said call processing applications and each of said platforms, each of said processors having one or more primary and/or standby functional components each of which carrying out a particular call processing function, the method comprising the steps of:

providing on said processors of said servers a standby functional component for at least one of said primary functional components;

keeping said standby functional component shadowed when its counterpart primary component operates properly and using said shadowed standby functional component when said primary component stops operating; and redirecting the load of the system among the available resources when a resource stops operating.

22. The method of claim 21 wherein said redirection of the load is performed according to a priority scheme.

23. The method of claim 21 wherein said primary functional components and their standby functional components are arranged such that each of said primary components and its counterpart standby component are not on the same server.

24. The method of claim 23 wherein each of said servers accommodates some of said primary components and some of said standby components such that the load of the system are shared among all of said servers.

* * * * *